(12) United States Patent
Yamaguchi et al.

(10) Patent No.: US 7,006,575 B2
(45) Date of Patent: Feb. 28, 2006

(54) PICTURE AND SOUND DECODING APPARATUS PICTURE AND SOUND ENCODING APPARATUS AND INFORMATION TRANSMISSION SYSTEM

(75) Inventors: Takao Yamaguchi, Sakai (JP); Akira Kamogawa, Katano (JP); Kunio Nobori, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/051,547

(22) PCT Filed: Aug. 1, 1997

(86) PCT No.: PCT/JP97/02696

§ 371 (c)(1),
(2), (4) Date: Apr. 7, 1998

(87) PCT Pub. No.: WO98/06222

PCT Pub. Date: Feb. 12, 1998

(65) Prior Publication Data

US 2002/0154699 A1    Oct. 24, 2002

(30) Foreign Application Priority Data

Aug. 7, 1996 (JP) .................................. 8-208147
Aug. 8, 1996 (JP) .................................. 8-209942
Nov. 13, 1996 (JP) .................................. 8-301559

(51) Int. Cl.
*H04N 7/12* (2006.01)

(52) U.S. Cl. ............ 375/240.26; 375/240; 375/240.01; 375/240.12; 375/240.24; 375/240.25

(58) Field of Classification Search ................ 375/240, 375/290.25, 240.12, 240.01, 240.24, 240.26; 386/81; 382/304; 709/236; 370/252
See application file for complete search history.

(56) References Cited

U.S. PATENT DOCUMENTS 4,562,466 A * 12/1985 Clapp et al. ............ 375/240.12
5,377,051 A * 12/1994 Lane et al. .................... 386/81

(Continued)

FOREIGN PATENT DOCUMENTS

EP    0713338    5/1996

(Continued)

OTHER PUBLICATIONS

Fukuda et al., "Hypermedia Personal Computer Communication System: Fujitsu Habitat," Fujitsu Sci. Tech. J., 26, 3, pp. 197-206 (Oct. 1990).

(Continued)

*Primary Examiner*—Allen Wong
(74) *Attorney, Agent, or Firm*—RatnerPrestia

(57) ABSTRACT

In order to control the coding quantity depending on the processing situation at the terminal when decoding or synthesizing plural pictures or sounds simultaneously, the decoding apparatus of the invention comprises a reception control unit 11 for receiving the information, a separation unit 12 for analyzing and separating the received information, a priority decision unit 14 for determining the priority of processing of the pictures separated in the separation unit 12, a picture expanding unit 18 for expanding the pictures according to the determined priority, s picture synthesizing unit 19 for synthesizing the pictures on the basis of the expanded pictures, a synthesis result accumulating unit 22 for accumulating the synthesized pictures, a reproduction time control unit 23 for controlling the time for starting reproduction, and an output unit 24 for delivering the result of synthesis according to the information of the reproduction time control unit 23.

27 Claims, 16 Drawing Sheets

U.S. PATENT DOCUMENTS

| | | | |
|---|---|---|---|
| 5,394,191 A | 2/1995 | Sirat et al. | 348/571 |
| 5,418,568 A * | 5/1995 | Keith | 375/240.25 |
| 5,461,679 A * | 10/1995 | Normile et al. | 382/304 |
| 5,485,211 A | 1/1996 | Kuzma | 375/240.16 |
| 5,510,844 A | 4/1996 | Cash et al. | 375/240.08 |
| 5,533,140 A | 7/1996 | Sirat et al. | 382/108 |
| 5,706,346 A | 1/1998 | Katta et al. | |
| 5,822,540 A * | 10/1998 | Caldara et al. | 709/236 |
| 6,266,327 B1 * | 7/2001 | Hernandez-Valencia | 370/252 |

FOREIGN PATENT DOCUMENTS

| | | |
|---|---|---|
| JP | 62-1384 | 1/1987 |
| JP | 62-231379 | 10/1987 |
| JP | 2-195787 | 8/1990 |
| JP | 4-3684 | 1/1992 |
| JP | 4-145786 | 5/1992 |
| JP | 5-122681 | 5/1993 |
| JP | 6-105226 | 4/1994 |
| JP | 6-153198 | 5/1994 |
| JP | 7-15715 A | 1/1995 |
| JP | 7-111647 A | 4/1995 |
| JP | 7-261776 | 10/1995 |
| JP | 7-298258 | 11/1995 |
| JP | 7-336666 A | 12/1995 |
| JP | 8-149420 | 6/1996 |
| JP | 8-154219 | 6/1996 |
| JP | 08-172616 | 7/1996 |
| JP | 8-289290 | 11/1996 |
| JP | 9-23422 | 1/1997 |

OTHER PUBLICATIONS

Nakamura, "Collabolation on Networked Virtual Reality," Information Technology Research Laboratories, NEC, pp. 17-23 (Sep. 17, 1993).

H. Fujiwara, "Latest MPEG Textbook", Aug. 1, 1994, pp. 104-105.

Japanese language search report for Int'l Appln. No. PCT/JP97/02696 dated Dec. 2, 1997.

English translation of Japanese language search report.

"Intel Indeo ® Video 5", *Compression Techniques for Great-Looking Indeo Video*, pp. 1-15 (Dec. 1997).

"What makes ASF good?", *Advanced Streaming Format*, pp. 1-4 (Dec. 1997).

"9.3 Profile of G.721", pp. 1-5.

Notice of Reasons Of Rejection, Patent Application No. 2002-230974, dated Jun. 29, 2004.

T. Nakajima, " Continuous Media Objects With Media Scaling," Lecture Note, Software Study 11, WOOC '95, Kindal Kagaku, Inc., pp. 97-106, Dec. 10, 1995, including an English Abstract.

Notice of Reasons Of Rejection, Patent Application No. 10-507809, Feb. 10, 204 (with English Translation).

Takao Nakamura, et al.; "A Note on a Scrambling Scheme with Variable Concealed Level for MPEG bitstream"; Technical Research Paper of the Institute of Electronics, Information and Communication Engineers, p. 19-24, vol. 95, No. 474, Jan. 20, 1996.

Tatsuo Nakajima; "Continuous Media Objects with Media Scaling"; Object-Oriented Computing III, Modern Science Cp., LTD., p. 97-106, Dec. 10, 1995.

Japanese Office Action for JP 2002-230974, dated Apr. 5, 2005.

* cited by examiner

Fig. 1
Decoding apparatus
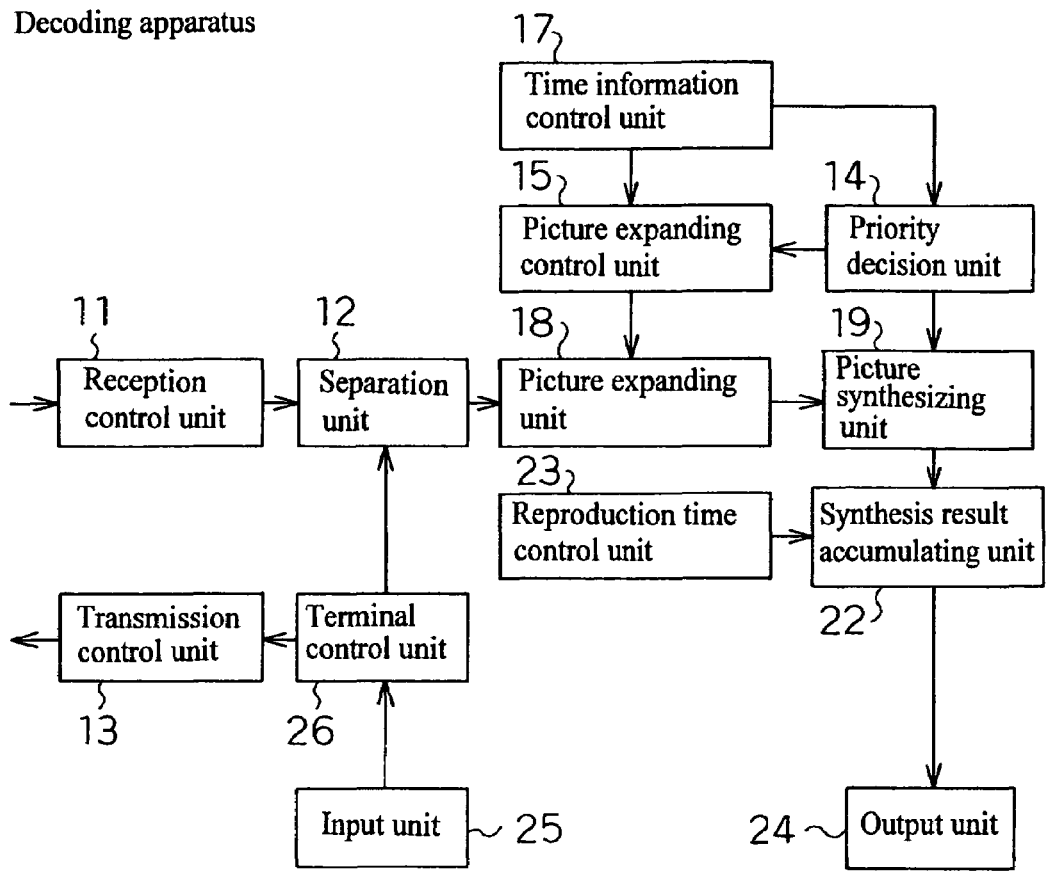
Coding apparatus
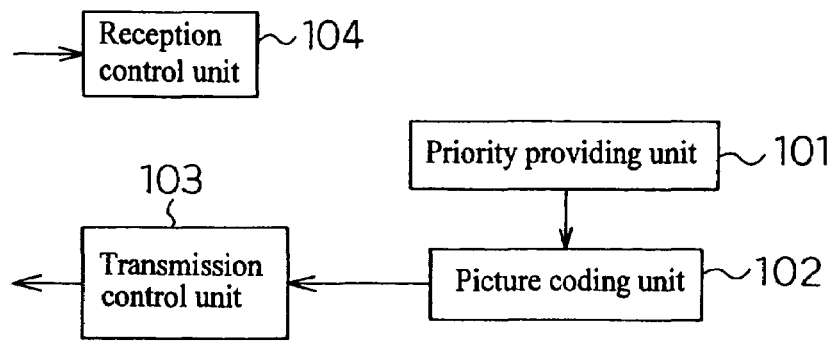

Fig. 2
Decoding apparatus
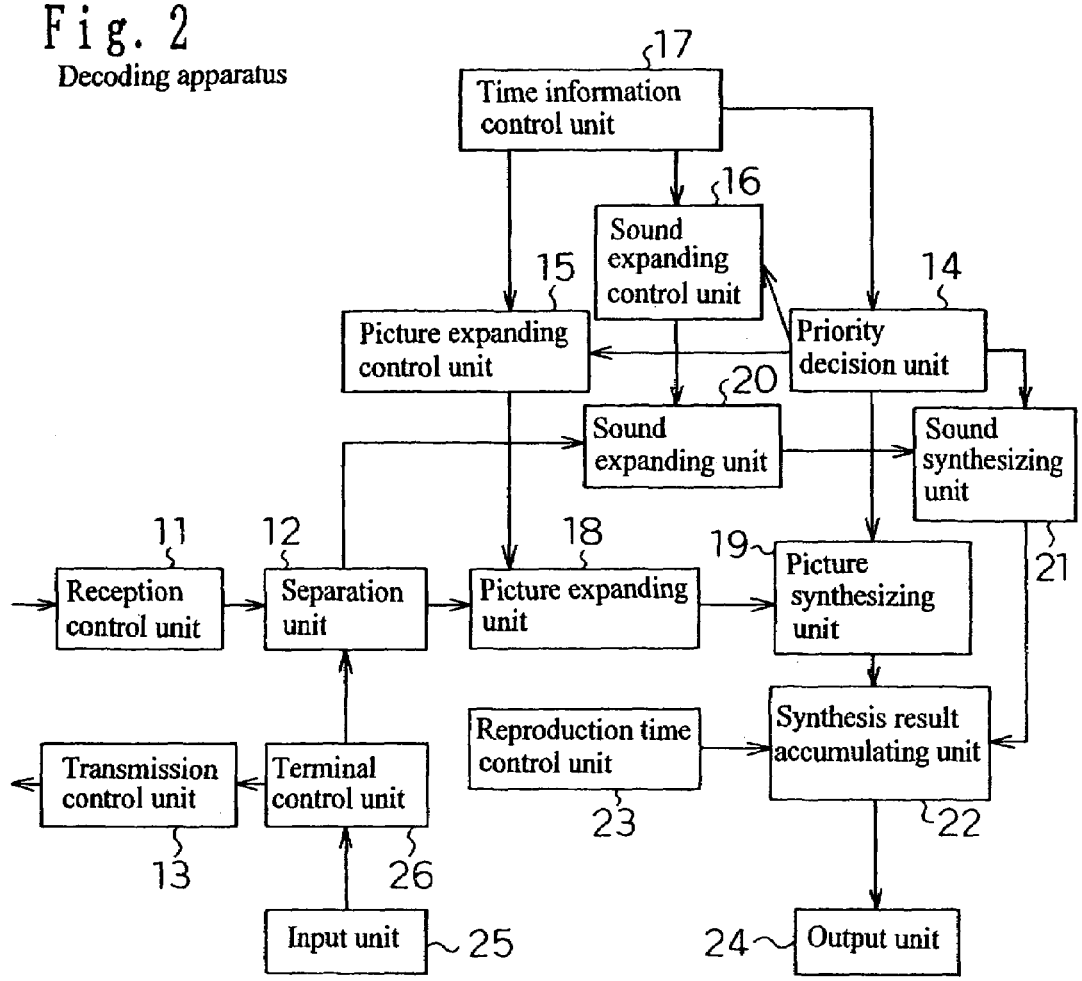
Coding apparatus
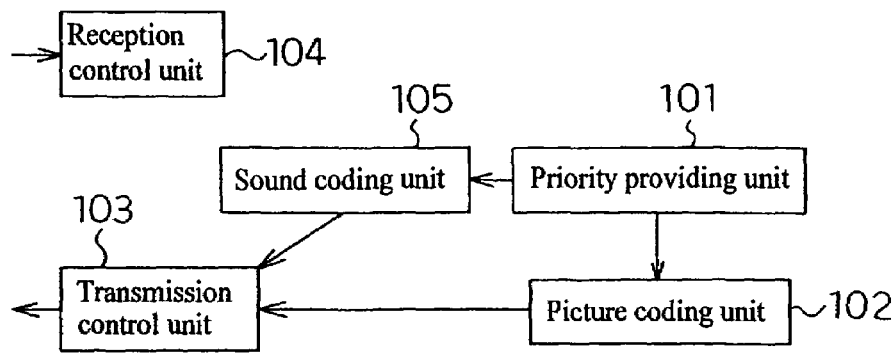

Fig. 5

B.
```
struct shm_tspkt {
    data_byte        188byte           Packet data
}
```

C.
```
struct shm_apkt {
    DWORD  sync_code        32bit   Packet synchronous code
    WORD   pts              16bit   Display time
    WORD   frame_length     16bit   Frame length
    BYTE   data_byte        Nbyte   Sound data
                                    (N=frame_length)
}
```

D.
```
struct shm_vpkt {
    DWORD  sync_code            32bit   Packet synchronous code
    BYTE   temporal_reference   8bit    Frame number
    WORD   frame_length         16bit   Frame length
    BYTE   data_byte            Nbyte   Picture data
                                        (N=frame_length)
}
```

E.
```
struct shm_kanshi_info {
    WORD  pts                    16bit   Display time
    BYTE  number_of_object       8bit    No. of objects
    for (i=0: i<number_of_object:i++)    {
        BYTE  object_id          8bit    ID
        BYTE  temporal_reference 8bit    Frame number
        BYTE  object_priority    4bit    Priority (*1)
              reserved           2bit
              IPB_flag           2bit    Frame type
        WORD  horizontal_offset  10bit   Display position, horizontal
        WORD  vertical_offset    10bit   Display position, vertical
        BYTE  layer              4bit    Layer
    }
}
```

(*1) Bits are assigned from the highest position sequentially by 4 bits (object_priority), 2 bits, 2 bits (IPB_flag)

Fig. 6

DEMUX thread

```
void demux ( )
{
        Shared memory (ring), semaphore generation process: for output
                (2 for sound, 3 for picture, 1 for monitor table)
        Semaphore generation for monitor thread control (one)
        BOOL   flag = TRUE:   //   State of ring buffer while(1) {
                if (flag) Reading from file or network                          - (5-1)

if (flag)
                        Analysis of 188-byte packet data, setting in specified structure   - (5-2)
                                (decomposed into information of sound, picture, monitor table)

//   Exclusive control of ring buffer by semaphore
                if  (Able to write in ring buffer ?) {
                        Write into ring buffer (from earlier object ID, write sequentially  - (5-3)
                                        into shared memory of earlier buffer number)
                        Advance write pointer of written buffer                 - (5-4)
                        flag=TRUE:
                } else
                        flag=FALSE:  //   Prevent overflow of ring buffer if (flag)
                        After writing information of pictures and sounds for one monitor  - (5-5)
                        table, advance  the counter of semaphore for monitor thread control
        }
}
```

Fig. 7

Monitor thread

```
void Watch Process ( )
{
    BYTE disp_TR[i]:   //  Picture serial number (shared memory)
    BOOL skip_flag[i]:  //  Skip flag to which decoding process refers
                                   (shared memory)
```

Shared memory (ring buffer: monitor table 1)
        Semaphore open: used by determining priority of processing
Shared memory (single buffer: monitor table 1)
        Semaphore generation: transfer to synthesis side
Generation of semaphore for process monitor
Semaphore open for monitor thread control (one)

Start of picture decoding process
Confirm start of process
```
while {skip_flag[i]=FALSE:  //  Not skipped } while (1)
{
```
    Reading of monitor table (read pointer update, from DEMUX)
    Check of object priority                                         - (6-1)   - (6-2)
    Writing of monitor table (to synthesis side)                  - (6-3)
    Wait for creation of data for one monitor table from DEMUX    - (6-4)

From highest priority
    {
```
        disp_TR[i]=TR:                                     - (6-5)
        if  ( Present time > display time (pts) ) {        - (6-6)
                Not skipped if I frame
                skip_flag[i]=FALSE
        }else{
                P, B frames are skipped
                skip_flag[i]=TRUE
        }
```
    Release of semaphore of corresponding process           - (6-7)
    Wait for release of semaphore of corresponding process    - (6-8)
                      (process completion check)
```
        }
    }
}
```

Fig. 8

Decoding process

```
void main (int argc, char *argv[ ] )
{
```

Value received from main process :
        Shared memory to be opened, name of semaphore Shared memory (ring), open processing of semaphore: for input (from MUX)
    Shared memory (single), open processing of semaphore: for output (to synthesis side)

```
    while(1)   {
```
        Monitor thread waits for release of semaphore     - (7-1)

Input picture state check:     - (7-2)
            Picture serial number (TR), skip input frame?

Wait for picture data to be decoded     - (7-3)

Is TR present in shared memory? {     - (7-4)
            Skip decoding if not present
            Advance read pointer for ring buffer (for input)
        }

```
        if  (Skip one input frame) {
```
            Decoding process     - (7-5)
            Advance read pointer for ring buffer (for input)
        }

Output of decoding result (*1)     - (7-6)
        Release semaphore to monitor thread (process end notice)     - (7-7)
    }
}

(*1) When skipping input frame process, send signal to main process without decoding process and output of decoding result

Fig. 9

Picture synthesis thread

```
void Watch Sync ( )
{
        Shared memory (single), semaphore generation process: for input (from decoder)
        Shared memory (single), semaphore generation process: for input (from monitor
                                                                                 thread)
        Shared memory (single), semaphore generation process: for output (to display
                                                                              monitor: 2)
        BOOL flag=TRUE:

while(1)   {
                Wait for monitor table from monitor thread          - (8-1)
                Check priority order of object                      - (8-2)

From highest priority order  {                      - (8-3)
                        Wait for picture of decoding result (accumulated in shared memory)
                        //   Totally black if empty
                }
                Synthesis of image adjusting to display position    - (8-4)

//    Double buffer
                if (flag)   {                                       - (8-5)
                        Write synthesis result into shared memory (to display monitor) #1
                        flag=FALSE:
                } else {
                        Write synthesis result into shared memory (to display monitor) #2
                        flag=TRUE:
                }
        }
}
```

Fig. 10

Display monitor thread

```
void Watch Disp ( )
{
    Shared memory (single), open processing of semaphore: for input
                                            (from synthesis thread: 2)
    BOOL  flag = TRUE:

while(1)
    {
        //  Double buffer
        if (flag)  {
            Wait for synthesis picture from shared memory (from synthesis thread)#1
            flag = FALSE:                                        - (9-1)
        } else {
            Wait for synthesis picture from shared memory (from synthesis thread)#2
            flag = TRUE:
        } if (Initial display)   {
            Acquire display start time from timer                - (9-2)
        }
        Sleep (pts-nowtime) :                                    - (9-3)
          Display of synthesis picture
    }
}
```

Three-dimensional picture (foreground: helicopter)

Three-dimensional picture (foreground: balloon)

Background picture (night sky)

Foreground picture (building)
Synthesis ratio: 0.5

Foreground picture (man)

System of hardware base

System of software base

* Sound compression apparatus can be set similarly

Fig. 14

| Picture size | Camera control | Other terminal control request | Quantization step |
|---|---|---|---|
| QCIF | Pan | Buffer over | 16 |
| CIF | None | None | 16 |
| QCIF | None | None | 18 |
| QCIF | Tilt | None | 14 |
| ⋮ | ⋮ | ⋮ | ⋮ |

Fig. 16
○ Feedback relating to response between transmission terminal and reception terminal (case 1)
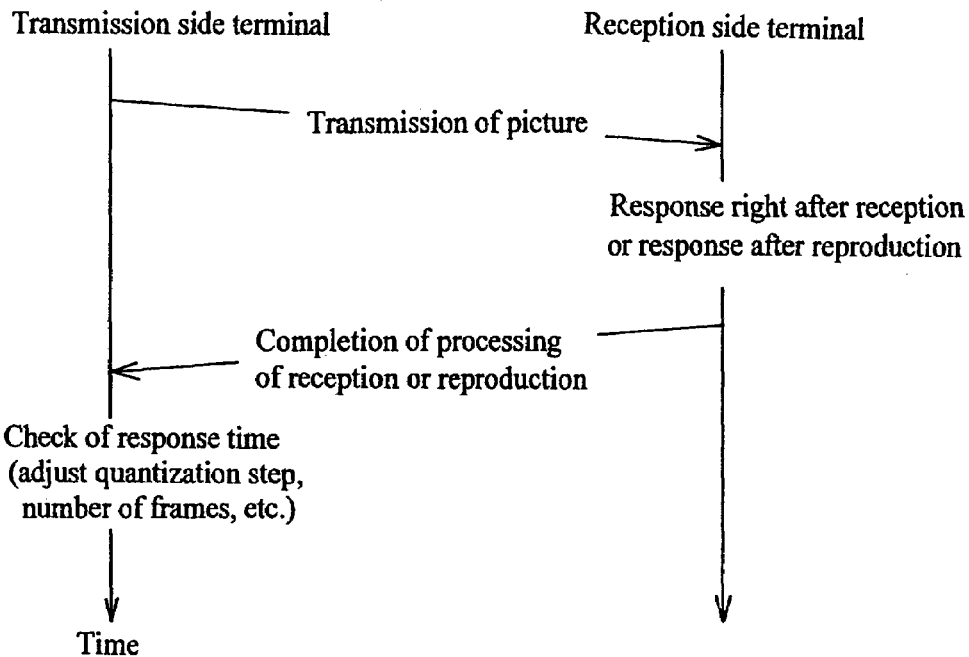
○ Feedback of reproduction situation to transmission side terminal (case 2)
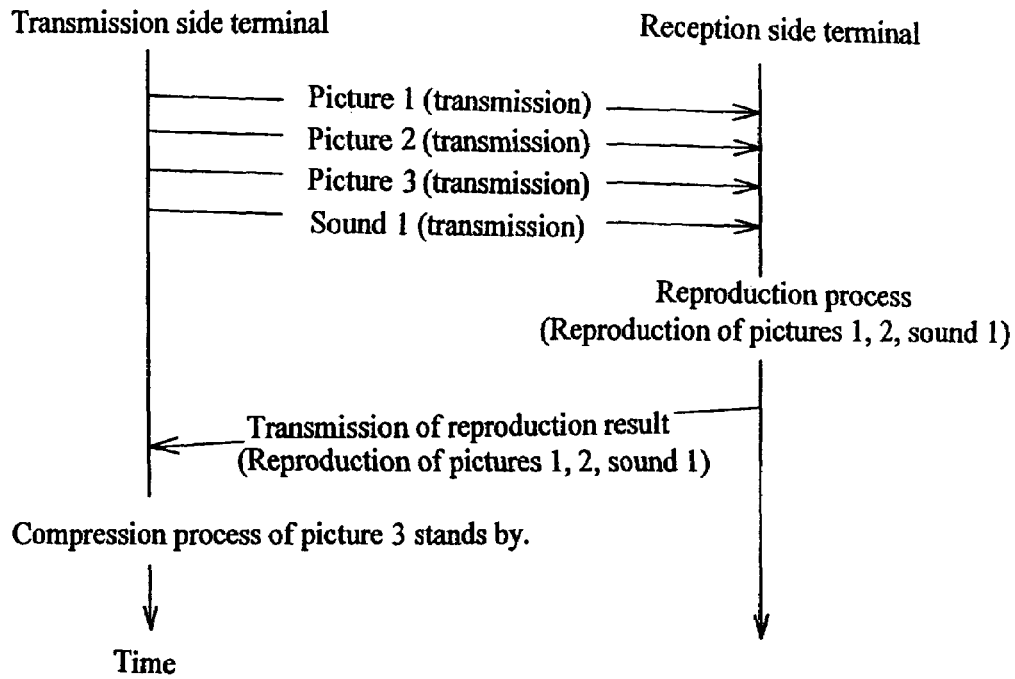

PICTURE AND SOUND DECODING APPARATUS PICTURE AND SOUND ENCODING APPARATUS AND INFORMATION TRANSMISSION SYSTEM

This application is a U.S. National Phase Application of PCT International Application PCT/JP97/02696.

TECHNICAL FIELD

The present invention relates to picture and sound decoding apparatus, picture and sound coding apparatus, and information transmission system for decoding, coding and synthesizing plural pictures and sounds simultaneously.

BACKGROUND ART

Hitherto there was a video communication system with a feel of presence by satisfying the sensation of the existence of a person in front of oneself, by extracting, for example, a human figure from the image of the space scene of one's own side, and superposing and displaying this image, and a human image sent from the opposite side, and a virtual space image preliminarily stored for displaying commonly with the opposite side (Japanese Patent Publication No. 4-24914, Hypermedia system personal communication system; Fukuda, K., Tahara, T., Miyoshi, T.: "Hypermedia Personal Computer Communication System: Fujitsu Habitat," FUJITSU Sci. Tech. J., 26, 3, pp. 196–206, October 1990; Nakamura: "Distributed cooperative job support by virtual reality sensation through network," Audio-Visual Compound Information Processing Research Group, Information Processing Society of Japan, 1993). In the prior art, in particular, in order to synthesize the images, methods about increasing the speed and reducing the memory capacity have been invented (for example, Japanese Patent Publication No. 5-46592, Image synthesizing apparatus; Japanese Laid-open Patent No. 6-105226, Image synthesizing apparatus).

In the prior art, however, image synthesizing systems for synthesizing two-dimensional still pictures and three-dimensional CG data have been proposed, but nothing has been mentioned about a method of realizing a system for synthesizing and displaying by decoding (expanding) plural motion pictures or sounds simultaneously. In particular, in the terminal device for simultaneously decoding, synthesizing and displaying plural pictures and sounds, nothing has been mentioned about the reproducing method of picture and sound not leading to breakdown due to shortage of terminal capacity or fluctuation of processing capacity. In addition, nothing has been discussed about the method of decoding, synthesizing and displaying plural pictures depending on the accounting situation.

More specifically, nothing has been considered about:

(1) method of controlling plural pictures, sound information, information describing the relation of plural pictures and sounds, and information of processing result; and (2) method about determining method of priority of decoding, synthesizing and displaying of plural pictures and sounds when the terminal processing state is overloaded, and also reproducing and accounting.

Further, in the environments of decoding, synthesizing and displaying plural pictures and sounds simultaneously, nothing has been considered about the method of controlling the quantity of coding by varying the method of compression of image depending on the state at the receiving terminal side or the priority of decoding, synthesizing, and displaying at the receiving terminal.

DISCLOSURE OF THE INVENTION

Considering these problems of the prior art, it is an object of the present invention to present a picture and sound decoding apparatus, a picture and sound coding apparatus, and an information transmission system capable of controlling the quantity of coding depending on the processing situation at the terminal when decoding or synthesizing plural pictures and sounds simultaneously, and capable of controlling decoding, synthesizing and displaying of plural pictures and sounds depending on the accounting situation.

The invention is not limited to synthesis of two-dimensional images alone. It may include an expression format combining two-dimensional image and three-dimensional image, and an image synthesizing method for synthesizing an image by combining plural adjacent images such as panoramic images.

The communication format of the invention is not limited to the wired two-way CATV or B-ISDN alone. For example, it may include radio wave transmission (for example, VHF band, UHF band) or satellite broadcasting for picture and sound from the center side terminal to the household side terminal, and analog telephone circuit or N-ISDN for information transmission from the household side terminal to the center side terminal (picture, sound and data are not always required to be multiplexed). It may further include the communication format making use of wireless means, such as IrDA, PHS (personal handy phone), and radio LAN.

Applicable terminals include portable terminals such as portable information terminals, and desk-top terminals such as set-top box and personal computer.

One aspect of the present invention is a picture decoding and coding apparatus comprising a picture coding apparatus including picture coding means for coding picture information, and transmission control means for transmitting or recording the coded various information, and a picture decoding apparatus including reception control means for receiving the coded various information, picture decoding means for decoding received various information, picture synthesizing means for synthesizing one or more decoded pictures, and output means for delivering the synthesized picture.

Another aspect of the present invention is a sound decoding and coding apparatus comprising a sound coding apparatus including sound coding means for coding sound information, and transmission control means for transmitting or recording the coded various information, and a sound decoding apparatus including reception control means for receiving the coded various information, sound decoding means for decoding received various information, sound synthesizing means for synthesizing one or more decoded sounds, and output means for delivering the synthesized sound.

Still another aspect of the present invention is a realtime picture coding apparatus comprising one or more picture input means for feeding pictures, picture input control means for controlling the control state of the picture input means, other terminal control request control means for controlling the reception state of a reception terminal, coding process decision means for determining the coding method of pictures depending on at least the controlled reception state of the reception terminal or the control state of said picture input means, picture coding means for coding said input picture according to the result of decision by the coding process decision means, and output means for delivering the coded picture.

A further aspect of the present invention is an information transmission system, being an information transmission system using at least one of the picture decoding and coding apparatus and the sound decoding and coding apparatus as the reception terminal, and at least one of the picture decoding and coding apparatus the sound decoding and coding apparatus and the real time picture coding apparatus as the transmission terminal, and connecting these terminals through a communication route, wherein one of the presence or absence of coding of pictures or sounds, priority of coding, coding method, picture size to be coded, value of quantization step, number of frames, and priority of processing when the reception terminal is overloaded is determined at the transmission terminal, by transmitting at least one of the load of the reception terminal, the information about the priority of coded information to be processed as being determined in the priority decision means at the reception terminal, and the frame skip situation at the reception terminal, to the transmission terminal.

BRIEF DESCRIPTION OF THE DRAWINGS

FIG. 1 is a schematic structural diagram of a picture decoding and coding apparatus in an embodiment of the invention;

FIG. 2 is a schematic structural diagram of a picture and sound decoding and coding apparatus showing other example in the same embodiment;

FIG. 5 is a diagram for explaining the composition of information;

FIG. 6 is a diagram for explaining the operation of DEMUX thread.

FIG. 7 is a diagram for explaining the operation of monitor thread.

FIG. 8 is a diagram for explaining the operation of decoding process;

FIG. 9 is a diagram for explaining the operation of picture synthesizing thread;

FIG. 10 is a diagram for explaining the operation of display monitor thread;

FIG. 14 is a diagram for explaining the information controlled by operation control unit;

FIG. 16 is a diagram for explaining the response situation between transmission terminal and reception terminal.

REFERENCE NUMERALS

Figure 3:
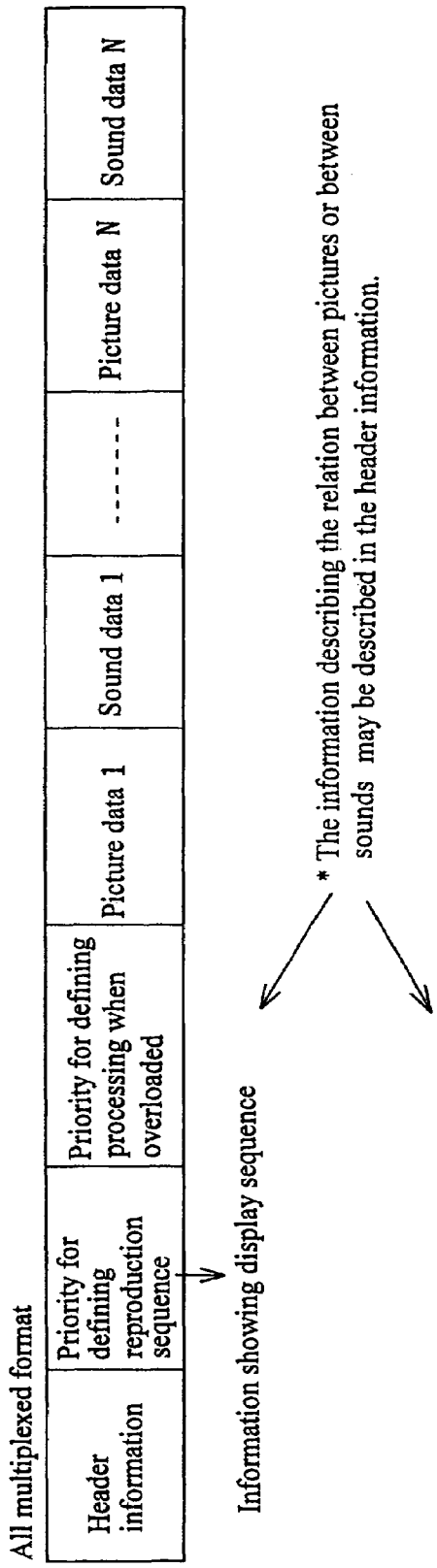
FIG. 3 is a diagram for explaining an example of adding information about priority in a communication and recording format.

11 Reception control unit
12 Separation unit
13 Transmission control unit
14 Priority decision unit
17 Time information control unit
18 Picture expanding unit
19 Picture synthesizing unit
20 Sound expanding unit
21 Sound synthesizing unit
31 DEMUX thread
36 Decoding process
37 Monitor thread
39 Picture synthesizing thread
42 Display monitor thread
1204 Operation control unit
1205 Picture compression unit
1208 Picture processing decision control means
1401 Priority decision control unit
1402 Operation history control unit
1404 Picture synthesizing unit
1407 Input unit

MODE FOR CARRYING OUT THE INVENTION

The invention is described below by referring to drawings showing its preferred embodiments. The term "picture" used in the invention includes both still picture and motion picture. The applicable pictures may be a mixture of two-dimensional picture such as computer graphics (CG) and three-dimensional picture as composed from a wire-frame model. In such a case, the relation between pictures corresponds to the wire-frame model. The script language for describing may include JAVA, VRML, etc, which language is incorporated herein by reference.

FIG. 1 and FIG. 2 are schematic structural diagrams of picture decoding and coding apparatus in an embodiment of the invention. FIG. 1 shows a constitution without sound reproducing function, and FIG. 2 shows a constitution having both picture and sound reproducing function. Of course, it may be constituted similarly for sound alone.

This apparatus shown in FIG. 1 or FIG. 2 is composed of a coding apparatus and a decoding apparatus, and the coding apparatus in FIG. 1 comprises a priority providing unit 101 for determining the priority of processing of coded picture at the time of overloading, and corresponding between the coded image and the priority, a picture coding unit 102 for coding the picture, a transmission control unit 103 for transmitting or recording coded information provided with priority, and a reception control unit 104 for receiving coded information. The coding apparatus in FIG. 2 further comprises a sound coding unit 105 for coding the sound.

On the other hand, in the decoding apparatus, a reception control unit 11 for receiving information and a transmission control unit 13 for transmitting information are means for transmitting information in coaxial cable, CATV, LAN, modem, etc. Connection formats of terminal include two-way sending and receiving format of video information between terminals such as TV telephone and TV conference system, and broadcasting type (one-way) picture broadcasting format by satellite broadcasting, CATV or Internet. In the invention, such connection formats of terminals are taken into consideration.

A separation unit 12 is means for analyzing and separating the coded (compressed) reception signal (in the case of compression apparatus, it is a reverse operation, and hence it corresponds to a multiplexing unit). For example, in MPEG1, MPEG2, and H. 320 terminal (regulation of TV telephone and conference apparatus using N-ISDN), the H. 221 is the regulation for multiplexing and separating the video/audio/data, and in the H. 324 terminal (regulation of TV telephone and conference apparatus using analog telephone circuit), the H. 223 is the corresponding regulation MPEG 1 and MPEG 2 Standards and the International Telecommunications Union (ITU-T) H.-series standards are all incorporated herein by reference. The invention may be realized either by the constitution conforming to the regulation or by the constitution not conforming to the regulation. Or, as done in the H. 323 or Internet, the picture and sound may be transmitted independently by different streams.

A priority decision unit 14 determines the priority of decoding (hereinafter referred to as "expanding") the information obtained from the separation unit 12 (for example, picture, sound, control information) when the terminal is overloaded in the following method, and expanding the picture or expanding the sound (in the method of determining the priority of processing, it may be preliminarily decided in the reception terminal device, or the information about the priority determined in the following method may be added to the recording media or transmission packet at the transmission side terminal (coding apparatus), and transmitted and added as recording format; as the method of expressing the priority, the priority may be expressed by non-numerical method such as large, medium and small, or by numerical method such as 1, 2, 3).

Using the identifier for handling data in the stream unit composed of plural picture or sound frames, by processing transmission and reception of data between the transmission side and reception side, control of buffer at the reception side, and scheduling of transmission of data at transmission side may be realized. That is, by noticing the identifier of the stream sent from the transmission side as required, the receiving situation at the reception side may be investigated, or the identifier of the stream not requiring may be noticed to the reception terminal, or the required stream may be demanded from the reception side.

The priority providing means for determining the priority of processing of coded information at the time of overloading by the standard mentioned above, and corresponding between the coded information and the determined priority may be provided in the picture coding apparatus or sound coding apparatus, and according to the priority of various receiving information at the time of overloading, the picture frame or sound of the priority to be processed may be determined by the priority decision means for determining the method of processing, so that coding or synthesizing process may be done. As for the picture frame, it is necessary to insert periodically the frame undergoing intraframe coding (I frame) so that the frame can be skipped.

The unit for providing the priority may be each unit of picture or sound (comparison of priority between frames), or the stream unit composed of plural frames (comparison of priority between streams).

The method of taking note of the feature of image includes the methods on the basis of the image compression format (for example, between H. 263 and run length, the priority is given to the run length), picture size (for example, between CIF and QCIF, the priority is given to the QCIF), contrast (for example, the priority is given to the higher contrast), picture synthesizing ratio (for example, the priority is given to the higher synthesizing ratio), quantization step (for example, the priority is given to the smaller quantization step), difference between inter-frame coding and intra-frame coding (for example, the priority is given to the intra-frame coding), display position (for example, the priority is given to the middle display position; or in the case of three-dimensional picture, the priority is low when the picture is set at inner side, and the priority is set high when displayed at the front side), frame number (the priority is high in first frame and final frame, or the priority is heightened for the frame of scene change, etc.), the number of frames (for example, the priority is higher in the picture smaller in the number of frames to be reproduced; the frame number corresponds to temporary reference (TR) in the case of H. 263, and it may be judged according to the change of TR value), the voiced section and silent section, the display time (PTS), and decoding time (DTS).

In addition, the same priority is given to the P frame and B frame by inter-frame coding. In the intra-frame coded pictures, by assigning priority in plural stages, the skipping frequency can be controlled.

Examples taking note of difference in media include the method of expanding the sound by priority over expanding of picture. As a result, the sound can be reproduced without interruption.

Furthermore, on the basis of the reproduction permit information controlled at the reception side terminal, the information to be expanded (picture, sound) may be determined, or the information to be expanded may be selected on the basis of the reproduction permit information sent from the transmission side as control information. The reproduction permit information specifically includes the accounting information (for example, if not paid duly, processing of expanding, synthesizing or display is not done; the accounting information can be controlled at the reception terminal side, or the accounting information may be controlled at the transmission side), the service content information (for example, in the case of an adult broadcast program, unless reproduction is permitted at the terminal side, processing of expanding, synthesizing or display is not done; the reproduction permit may be controlled at the reception side terminal or at the transmission side terminal), the password (for example, a specific program is not expanded, synthesized or displayed unless the password is entered; the password may be controlled at the reception side terminal or at the transmission side terminal), the user code (for example, unless the user is permitted, processing of expanding, synthesizing or display is not done; the user code may be controlled at the reception side terminal or at the transmission side terminal), and the nation code (for example, the picture and sound to be expanded, synthesized and displayed, and the reproduction method are changed depending on the nation; the nation code may be controlled at the transmission side or at the reception side; scrambling is realized by changing the reproduction method by the nation code).

The reproduction method by limiting the permission of reproduction of picture and sound by the accounting information, service content information, password, or user code includes the method of deviating the position or pixel intentionally when synthesizing and displaying the picture, changing the magnification or contraction of picture or sampling of picture (for example, by low pass), inverting the pixels, changing the contrast, changing the color pallets, and skipping the frames. In these picture reproducing methods (expanding, synthesizing and display pictures), each frame may be restricted. Or, in the unit of GOB (group of block) which is an independent processing unit smaller than one frame, as defined by H. 263 which is one of picture compression techniques, the picture expanding, synthesizing and display method may be restricted, so that more flexible control is realized as compared with the conventional technique of disturbing the entire picture. That is, by processing in the GOB unit, only a part of the picture can be scrambled, and the interactive software such as the software using the image synthesis can be evaluated.

Similarly, sound reproducing methods include the methods of changing the sound level, changing the sound direction, changing the sound frequency, changing the sound sampling, and inserting different picture or sound (in any method, it is divided into the method of processing preliminarily at the transmission side, and the method of processing at the reception side).

The reproducing method of picture and sound includes a method of canceling the synchronism of picture and sound. The priority of picture and sound to be expanded, or the presence or absence may be determined by the information indicating the rank of synthesizing and displaying (the display sequence is preliminarily determined at the reception side terminal, for example, the priority is given to the CIF or still picture, or the display sequence is added preliminarily to the transmission information at the transmission side as the information about priority), the information indicating the rank of expanding (the expanding sequence is preliminarily determined at the reception side terminal, for example, the priority is given to the QCIF or intra-frame coded picture data, or the speech sound is expanded by priority over BGM; similarly, the display sequence is added to the transmission information at the transmission side), the user's instruction (for example, the picture or sound information to be expanded, synthesized or displayed is selected by the user's instruction, or the picture or sound information to be expanded, synthesized or displayed is determined on the basis the information selected according to the request), the terminal processing capacity (for example, by measuring the occupation time of CPU processing in a specific period at the present or in the past, expanding, synthesizing or displaying of the picture or sound supposed to take time is restricted; as the estimating method of processing time, the time required for local decoding when compressing, or the time required for compression is controlled in relation to the compressed picture information, so that the presence or absence of expanding, synthesizing or displaying, or the priority can be determined), the reproduction time (for example, expanding, synthesizing or displaying of the picture or sound information passing the reproduction time is stopped), or the decoding time.

In addition, as the method for preventing specific picture or sound from being expanded or displayed by priority, on the basis of the information relating to the execution rate for processing of expanding, synthesizing or displaying of picture or sound, the sequence or presence or absence of the picture to be expanded, synthesized or displayed can be determined. For example, once out of ten times of expanding, it is set at the reception terminal side that the picture of CIF size is expanded, or by specifying the execution rate of expanding, synthesizing or displaying the picture or sound at the transmission side, the picture information or sound information can be transmitted according to this. The execution rate is specifically defined by the insertion interval of I frame (intra-frame coded frame). As a result, expanding, synthesizing or displaying of specific picture or sound object only is prevented.

Such information about the priority for controlling expanding, synthesizing or displaying may be added not only at the transmission side apparatus, but may be also added and controlled at a relaying apparatus. Moreover, by transmitting the information about the priority determined in the priority decision unit 14 of the decoding apparatus at the reception terminal, to the transmission destination through the transmission control unit 13, the picture or sound can be transmitted depending on the situation of determination in the priority decision unit 14 (by sending the ID of the picture object that is hardly selected to the transmission side, wasteful transmission is prevented). Incidentally, the information showing the priority of processing when the reception terminal is overloaded may be determined at the reception terminal apparatus, or may be transmitted as transmission format, or the transport stream of MPEG2 may be expanded as the format for recording in the recording media such as CD-ROM or hard disk, or the transmission and recording format without consideration of standardization may be also employed. Or, using different streams in individual media (picture, sound, information describing the relation of picture and sound), data may be transmitted and recorded without multiplexing.

The picture expanding unit 18 as picture decoding means is means for expanding the picture (hereinafter coding means in the case of the coding apparatus), and the picture formats handled in the picture expanding unit 18 include MPEG1, MPEG2, H. 261, H. 263, and others. The picture may be expanded in the unit of one frame, or it may be processed in the unit of GOB specified in H. 263. When processing in the unit of one frame, in the case of inter-frame coding, the expanded state of the previous frame must be stored in the picture expanding unit 18. When the picture is expanded in the GOB unit, the sequence relation of expanding the pictures does not matter. Therefore, when expanding in the GOB unit, plural picture expanding units 18 are not required in the receiving apparatus, and plural pictures can be expanded by one picture expanding unit 18. To the contrary, the results of expanding must be accumulated.

The sound expanding unit 20 as the sound decoding means in FIG. 2 is the means for expanding the sound, and the sound format handled in the sound expanding unit 20 includes G. 721 and G. 723. The method for processing includes the software processing by DSP or general-purpose CPU, and processing by special-purpose hardware.

When realizing by the software, expanding process of picture and sound is individually controlled in the unit of one process or thread, and when there are simultaneously plural pictures or sounds to be expanded, they are processed by dividing the time by the number of processes or threads in the range to be processed.

The picture expanding control unit 15 is means for controlling the expanded state of picture. The sound expanding control unit 16 is means for controlling the expanded state of sound. For example, when realizing these control units by the software, the compressed information obtained from the separation unit 12 is transferred to the picture expanding unit 18 and sound expanding unit 20 in the predetermined sequence (for example, executing first in the sound expanding unit 20 and then executing in the picture expanding unit 18), and the expanded state is controlled. When all expanding is over, the expanded information is transferred to the picture synthesizing unit 19 or sound synthesizing unit 21. In the software, by using shared memory and semaphore, the transferred information is limited, or end of expanding process is known (detail is described later).

A time information control unit 17 is means for controlling the information about the time. For example, when realizing the system by a personal computer, the time information can be realized by utilizing the timer of the personal computer.

The picture synthesizing unit 19 synthesizes a picture on the basis of the expanded image data. When synthesizing plural pictures, the pictures are synthesized on the basis of the synthesis ratio ($\alpha$ value) of each picture. For example, when synthesizing two pictures, if the synthesis ratio of the foreground picture is $\alpha$, the RGB value of the background picture is mixed at a rate of 1−$\alpha$, and the foreground picture, at $\alpha$. Incidentally, the picture to be expanded is controlled in the processing in the unit of one frame, and therefore when synthesizing plural pictures by using the display time, the system configuration and mounting can be simplified. Until discarding of the expanding result is instructed from the transmission side in the picture synthesizing unit 19 or sound synthesizing unit 21, by holding, controlling and utilizing the expanding result, it is not necessary to send the information of same pattern repeatedly from the transmission side.

On the basis of the information describing the relation of mutual pictures or mutual sounds, when combining the picture or sound, by presenting that the pictures or sounds that cannot be synthesized are present as necessary decoded pictures or sounds are not ready, the user can know the state of synthesis. Accordingly, the user instructs to select the necessary picture quality or select the picture desired to be synthesized beforehand, so that necessary information can be synthesized without dropout. Incidentally, the method of accumulating and controlling the decoded picture and sound data in the buffer includes the methods of erasing from the older data in the sequence of arrival, and erasing by observing the script describing the relation of mutual pictures or mutual sounds, and also observing the state of use of the decoded picture or sound data on the whole.

The sound expanding control unit 16 controls the expanding state of at least one sound expanding unit 20 for expanding the sound.

The sound synthesizing unit 21 is means for synthesizing the sound on the basis of the expanded information, and a synthesized result accumulating unit 22 is means for accumulating the picture synthesized by the picture synthesizing unit 19 and the sound synthesized by the sound synthesizing unit 21.

A reproduction time control unit 23 is means for reproducing the synthesized picture or sound at the time for starting reproduction.

An output unit 24 is means for issuing the synthesized result (for example, display and printer), and an input unit 25 is means for entering information (for example, keyboard, mouse, camera, video). A terminal control unit 26 is means for controlling these units.

FIG. 3 is a diagram for explaining an example of a case of adding information about priority in communication and recording format.

FIG. 3(a) shows an example of multiplexing all media completely (picture, sound, control information). The control information includes the priority for determining the processing when overloaded (the priority as indicated in the invention), and the priority showing the sequence of display. The control information may also include the information about the relation between pictures, between sounds, or between picture and sound (in terms of time or position). The example in FIG. 3 (a) is suited, for example, to application in multiplexing of MPEG1/2, or packet multiplexing mixing control information and data (picture, sound) such as H. 223. The priority of processing in overload is added in the frame unit or stream unit.

FIG. 3(b) shows an example of multiplexing information in every media. In this example, the control information, picture information, and sound information are transmitted from individual communication ports. The information about the relation between pictures, between sounds, and between picture and sound may be transmitted as control information from different communication port from that of picture or sound. It is suited to application where plural communication ports can be established simultaneously, such as in H. 323 and Internet, and as compared with FIG. 3(a), multiplexing process can be simplified, so that the terminal load can be alleviated.

As the method for describing mutual pictures or mutual sounds, it may be considered to be applicable by descriptive language such as JAVA and VRML, but the specification of descriptive language of the script may not be determined automatically. Accordingly, by adding an identifier for identifying the descriptive method of the information describing the relation between pictures or between sounds (for example, information in terms of position or time, such as display period), it is applicable to plural methods of description. To add the identifier for identifying the information descriptive method, for example, in MPEG2, it is provided in the program map table for controlling the stream of MPEG2-TS, or in the stream describing the script. The priority of processing in overload is added together with the information describing the corresponding relation of picture and sound (control information). In the MPEG2, in order to control by the program map table for relating the video stream and audio stream of MPEG2-TS (transport stream), the structural information and stream for relating between picture and sound may be defined and controlled, so that it can be transmitted independently of the data also in the MPEG2.

Figure 4:
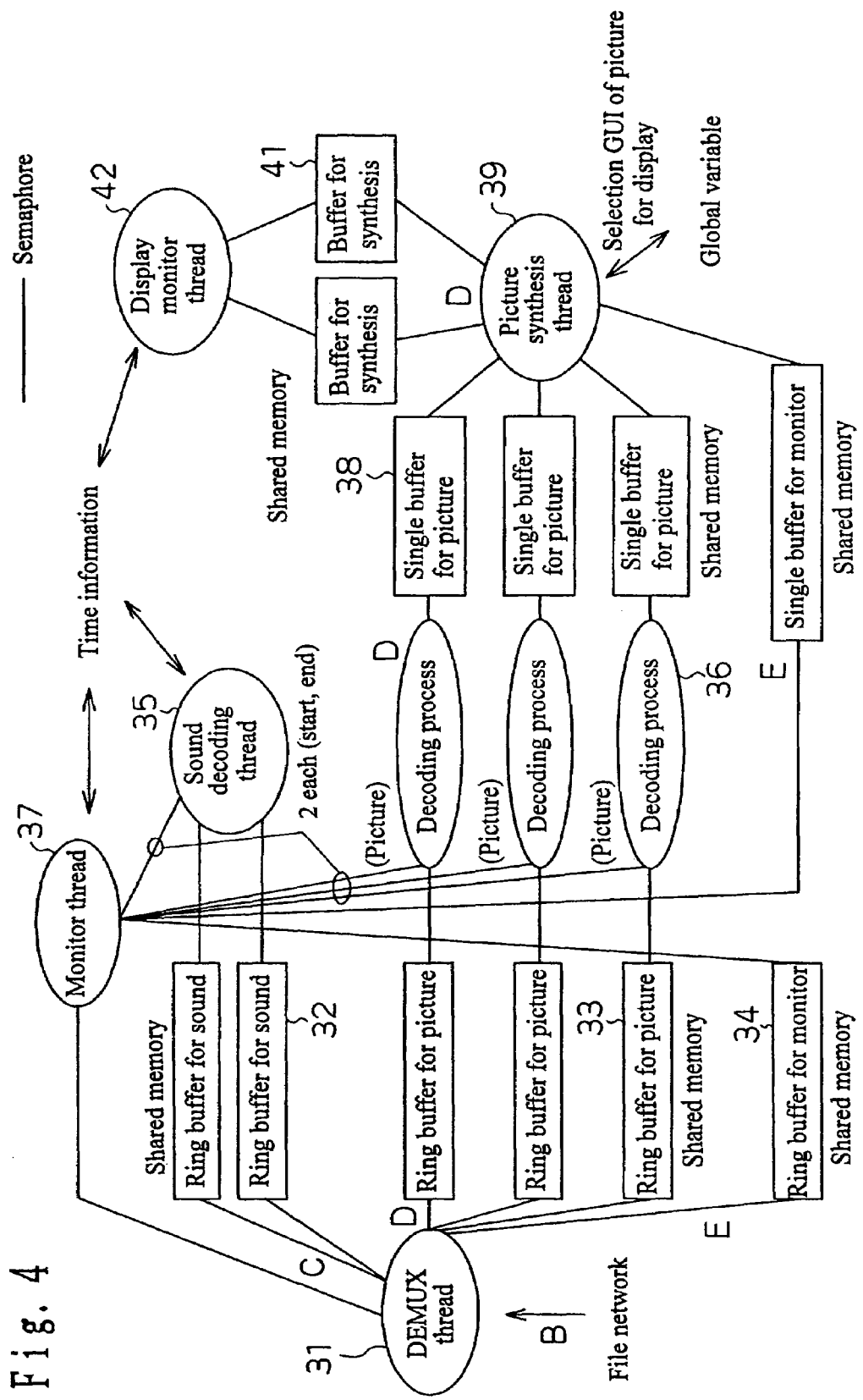
FIG. 4 is a diagram for explaining an example of composing the invention by software.

FIG. 4 is a diagram explaining an example of composing the invention by the software. When the invention is realized on the operating system capable of operating in multitask, each process explained in FIG. 1 and FIG. 2 is divided into execution module units of software such as process and thread, and between processes or between threads, information is exchanged by shared memory, and the shared information is controlled exclusively by the semaphore (in the example in FIG. 4, the area indicated by solid line corresponds to the semaphore). The function of each process and thread is described below.

A DEMUX thread 31 reads the information (picture, sound, control information) multiplexed from the network or disk, and separates into a monitor table (detail given below) describing the corresponding relation of sounds, pictures, and sound and picture and the information about reproduction time. The DEMUX thread 31 corresponds to the separation unit 12. The information separated by the DEMUX thread 31 is sent out into a sound ring buffer 32, a picture ring buffer 33, and a monitor ring buffer 34. In the case of sound information, the information sent out into the ring buffer 32 is expanded in a sound decoding thread 35 (corresponding to the sound expanding unit 20). In the case of picture information, the information sent out to the ring buffer 33 is expanded in a decoding process 36.

The monitor table is sent out to the ring buffer 34, and is utilized in a monitor thread 37 for determining the sequence for expanding the picture (corresponding to the control terminal unit 26, picture expanding control unit 15, and sound expanding control unit 16 above). The same monitor table is utilized in a picture synthesizing thread 39 for synthesizing a picture. The monitor table utilized in the monitor thread 37 reads out the next table from the ring buffer 34 when expanding of all sound and pictures is over. The picture information expanded in the decoding process 36 (corresponding to the picture expanding unit 18) is sent out to a picture single buffer 38. When the transmitted pictures are all ready, the picture is synthesized by using the ratio of the image synthesis controlled in the monitor table, by a picture synthesis thread 39 (corresponding to the picture synthesizing unit 19). The result of synthesis is accumulated in a synthesis buffer 41 (corresponding to the synthesis result accumulation unit 22), thereby waiting in display wait state until reaching the display time in a display monitor thread 42 (corresponding to the reproduction time control unit 23).

FIG. 5 is a diagram for explaining the composition of information used in the constitution in FIG. 4. In the example in FIG. 5, the information received from the disk or network has a fixed length of 188 bytes (B). The composition of the sound information separated in the DEMUX thread 31 is composed of packet synchronous code, reproduction time, frame length showing the length of sound to be reproduced, and sound data (C). The composition of picture information is composed of packet synchronous code, frame number for identifying the picture, frame length for showing the size of picture information, and picture data (D). The invention does not require processing in the unit of one frame, but it is allowed to process in a small block unit such as macro block unit.

The composition of monitor table is composed of picture display time, number of pictures to be displayed (synthesized) in one frame, ID of each picture, frame number, priority for expanding or displaying, identifier showing the frame type (I picture, P picture, B picture), display horizontal position, display vertical position, and each information of layer showing the ratio of synthesis (E). Incidentally, the synthesis ratio of picture and synthesis ratio of sound may be changed by correspondence. For example, when two pictures correspond to two sounds respectively, if the picture synthesis ratio is $\alpha:1-\alpha$, the corresponding sound synthesis ratio may be also $\alpha:1-\alpha$. Not limited to the relation between pictures, the relation between sounds may be also described (for example, direction, kind such as BGM or speech sound).

FIG. 6 is a diagram for explaining the operation of DEMUX thread. From a file or network, data of fixed length of 188 bytes is read in (5-1). The read data is analyzed, and set in the type of the structure of sound, picture or monitor table as mentioned above (5-2). If possible to write into the ring buffer, the sound, picture and monitor tables are written into individual ring buffers. The corresponding relation of picture object ID and plural picture expanding means is obtained. In this example, from the object ID of the earlier number, the data is sequentially written out into the shared memory of the earlier ring buffer number (5-3). The write pointer of the written buffer is advanced (5-4). After writing the picture and sound information for one monitor table, the counter of the semaphore for monitor thread control is updated (5-5). Thus, the monitor thread is controlled from the DEMUX.

FIG. 7 is a diagram for explaining the operation of the monitor thread. Reading in the monitor table, the read pointer is advanced (6-1). Checking the priority of object in overload, the picture frame of high priority is investigated (6-2). The content of the monitor table is transferred to the synthesis side thread (6-3). The next step is to wait for creation of data for the portion of one monitor table from the DEMUX (6-4). In the sequence of higher priority of processing, the frame number of picture to be displayed is written into the decoding process (6-5), and the present time and display time are compared, and if not in time, without skipping the I frame, only the frame of PB is skipped (6-6). Permitting the execution of the corresponding decoding process (6-7), completion of processing is awaited (6-8).

FIG. 8 is a diagram for explaining the operation of the decoding process. The first step is to wait for permission of execution from the monitor thread (7-1). The state of input picture is checked, and it is investigated if the picture serial number and the entered frame are to be skipped or not (7-2). The next step is to wait until the picture data to be decoded is collected in the ring buffer (7-3). If there is no corresponding picture data in the serial number of the picture indicated from the monitor thread, decoding is skipped, and the read pointer is advanced (7-4). If the input picture is not skipped, the decoding is processed, and the read pointer is advanced (7-5). The decoding result is issued (7-6), and end of processing is noticed to the monitor thread (7-7).

When expanding different types of picture objects by using the same process (or the same thread, or processor in the case of hardware), by controlling in correspondence between the frame number of the picture expanded in the past and the image before being expanded in the decoding process, it is not necessary to generate and utilize multiple processes simultaneously (at least, only the information relating to the immediately preceding frame is enough; if there are different types of frame pictures such as I, P, B, the control sequence and output sequence are different, and therefore such control in the decoding process is needed).

FIG. 9 is a diagram for explaining the operation of picture synthesis thread. The first step is to wait for monitor table from the monitor thread (8-1). The priority of the picture to be processed is checked (8-2). Next is to wait for the picture of decoding result from the higher priority (8-3). The picture is synthesized according to the display position (8-4). The synthesizing result is written into the synthesis buffer (8-5). The picture information to be displayed is selected either by the picture expanding means or the picture synthesizing means. When skipping the picture object ID that is not to be displayed, it is necessary to notice that the expanding result is not issued to the picture synthesizing means. Concerning the sound, the sound information to be reproduced can be selected either by the sound expanding means or the sound synthesizing means.

FIG. 10 is a diagram for explaining the operation of display monitor thread. First is to wait until the synthesis picture is written (9-1). In the case of a first display, the time of starting display is acquired (9-2), and the corresponding relation with the time to be displayed is controlled. If not reaching the display time, waiting until reaching the time, the display of synthesis picture is delayed (9-3).

Figure 11:
FIG. 11 is a diagram for explaining the user interface picture synthesizing apparatus.

Referring now to FIG. 11, the user interface of the picture synthesizing apparatus of the invention is described below.

In the example in FIG. 11, the foreground picture is combined with the background picture, and the building located at a remote position is synthesized as a translucent image at the synthesizing ratio of 0.5. As shown in FIG. 11, the picture to be used is not required to be two-dimensional picture. The helicopter and balloon shown in the foreground as three-dimensional image are synthesized with the background in two-dimensional image. The helicopter and balloon in the foreground are not always required to be three-dimensional images. The picture may be expressed as two-dimensional image when located at a remote position (which may be defined in the size displayed in two dimensions on the screen; for example, if smaller than the size of 20 dots×20 dots, the object may be defined to be located at a remote position), and as three-dimensional image when located at a near position. The picture to be mapped in the wire-frame model of three-dimensional image is not limited to still picture, but may be also a motion picture. Concerning the picture quality, by setting the picture quality high in the central portion and lower in peripheral parts, the necessary information demanded by the user can be selectively transmitted by priority (by changing the picture quality depending on the picture synthesizing position in this way, it is expected to enhance the response). Besides, in the case of three-dimensional picture, the priority may be set low in the picture displayed remotely and the priority may be set high in the image displayed closely. The control of picture quality can be realized by changing the quantization step.

Figure 12:
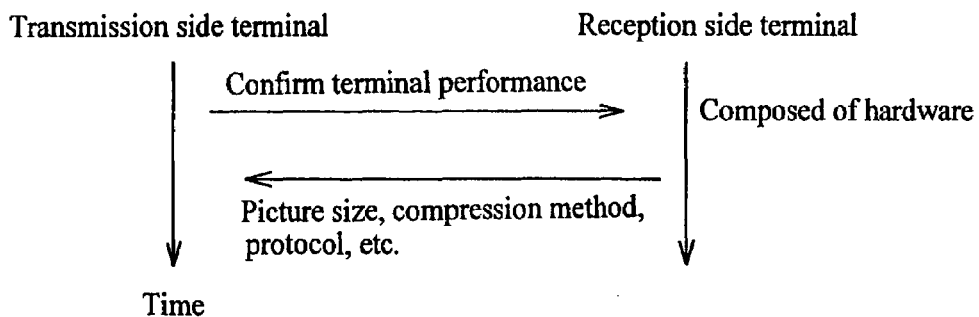
FIG. 12 is a diagram for explaining the method of picture transmission depending on fluctuation of capacity of the receiving side terminal.
Figure 12:
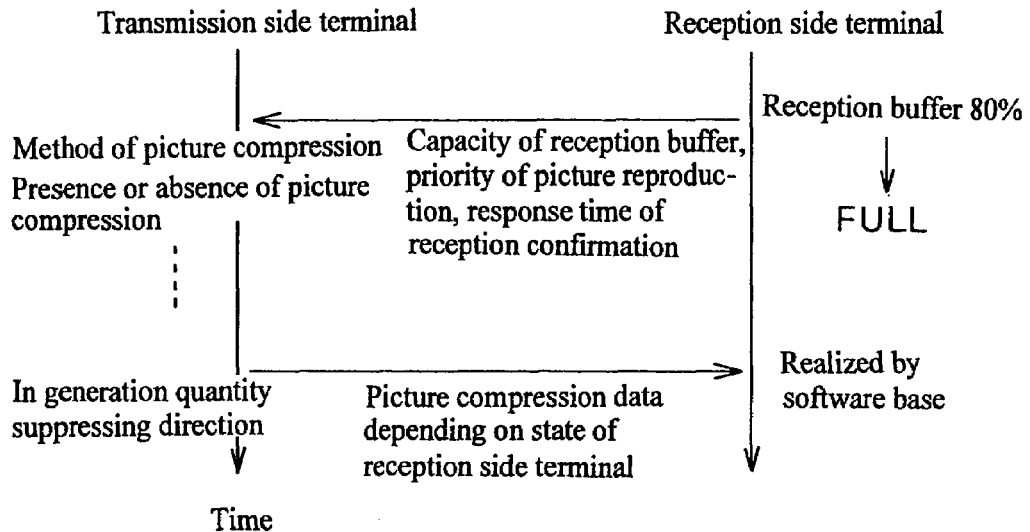

FIG. 12 is a diagram explaining the method of picture transmission depending on fluctuation of capacity of the reception side terminal. Herein, to prevent overload of processing of reception terminal as the pictures to be transmitted are increased, the method of controlling and managing including the compression apparatus is described. For example, in the video-on-demand system of MPEG2 base realized by the hardware, the transmission side terminal confirms the performance of the reception side terminal (for example, the image compression method, size and communication protocol) mutually before transmitting and receiving video information. Accordingly, at the transmission side terminal, since the processing capacity of the reception side terminal is nearly established, it is not necessary to monitor sequentially the reception state or reproduction state of the reception side terminal.

On the other hand, when realizing picture compression and expansion by the hardware, the number of pictures to be compressed and expanded at the terminal is fixed. However, when realizing the picture compression and expansion by the software, the number of pictures to be compressed and expanded at the terminal can be dynamically varied. When compressing or expanding the picture in the multitask environments by the software, effects are large by the picture size, the quantization parameter for compressing the picture, and the object picture (whether intra-frame coding or inter-frame coding, content of the taken picture), and others, and the picture size to be processed (compressed, expanded) at the terminal and the number of pictures to be processed simultaneously vary with the time. Accordingly, at the transmission side terminal, unless sequentially determining the picture compression method (method of picture compression, presence or absence of picture compression, quantization step, priority of compression, picture size to be compressed, etc.) depending on the reception situation of reception side terminal (for example, capacity of reception buffer, priority of reproduction of picture, response time of reception confirmation), and determination of priority when the reception terminal is overloaded, it may exceed the capacity of the reception side, finally leading to breakdown.

For example, as shown in FIG. 12(b), if the capacity of the reception buffer of the reception side terminal exceeds 80%, the nearly overflow state of the reception buffer is noticed to the transmission side, and the measure is executed by properly selecting and combining the method of picture compression (for example, changing from MPEG1 to run length, transmission quantity of compressed picture is decreased), the method of limiting the transmission quantity by presence or absence of compressed picture (compressing the picture, and stopping transmission temporarily), change of priority of compression (if there are plural processes to be compressed, the priority for compressing is lowered, and the transmission quantity of picture to be compressed is decreased), change of picture size (changing the compression size from CIF to smaller QCIF, the transmission quantity of compressed picture is decreased), or change of quantization step (decreasing the transmission quantity of compressed picture by changing the picture quality), the method of adjusting the number of frames (decreasing the number of frames to be processed), and the method of determining the priority when the reception terminal is overloaded. As a result, overflow of the reception buffer at the reception side terminal is avoided.

Similarly, when the capacity of the reception buffer at the reception side is under 20%, the nearly underflow state of the reception buffer at the reception side terminal is noticed to the transmission side, and in the reverse manner of the above, at the transmission side terminal, the method of picture compression, presence or absence of picture compression, priority of picture compression, picture size, quantization step, and number of frames are properly selected and combined, and executed. By thus executing the method of increasing the transmission quantity, the underflow of the reception buffer at the reception side terminal can be avoided.

Aside from monitoring of the state of the reception buffer, if the reproduction capacity at the reception side terminal is limited and there are plural pictures to be reproduced, it is necessary to determine definitely the pictures to be reproduced by priority by the user at the reception side terminal, or determine automatically all pictures to be reproduced by priority at the terminal side (the pictures to be reproduced by priority must be registered by the user preliminarily in the reception terminal as the rule; for example, the priority may be given to the picture of smaller size, or the reproduction interval is low in the pictures displayed in the background). It may be easily realized by noticing the load of the reception side terminal (for example, the occupation time of CPU necessary for reproduction) to the transmission side terminal.

When the reproduction load of the reception side terminal exceeds 80% of the processing capacity of the terminal, it is noticed to the transmission side that the reception side terminal is overloaded, and receiving this notice, at the transmission side, in order to lower the lower to be processed at the reception side terminal in the same manner as above, the processing capacity at the reception side terminal is alleviated by properly selecting, combining and executing the method of picture compression (for example, changing from MPEG1 to run length, processing amount is decreased), the method by presence or absence of compressed picture (compressing the picture, and stopping transmission temporarily), change of priority of compression (the priority for compressing is lowered for the picture lower in importance, and picture of higher importance is compressed and sent out by priority), change of picture size (changing the compression size from CIF to smaller QCIF, the reproduction side load is decreased), or change of quantization step (decreasing the transmission quantity of compressed picture by changing the picture quality), the method of adjusting the number of frames, and the method of processing according to the priority in overloaded processing.

To the contrary, when the load is under 20% of the processing capacity of the reception side terminal, it is known there is an allowance in the processing capacity at the reception side terminal, and in the reverse manner of the above, at the transmission side terminal, the method of picture compression, presence or absence of picture compression, priority of picture compression, picture size, quantization step, and number of frames are properly selected and combined, and executed, so that the picture of high quality and short frame intervals is sent out to the reception side terminal. As a result, picture transmission making the use of the capacity of the reception side terminal is realized.

Finally, the processing situation of the reception side terminal is known from the response time of confirmation of reception from the picture synthesizing apparatus at the reception side. For example, when video data is sent out from the transmission side terminal to the reception side terminal, the reception side terminal replies the reception of video data or completion of decoding process, synthesizing or display process to the transmission side terminal, and supposing this response time to be, for example, within 1 second as an ordinary value, if the load increases at the reception side terminal, the response time is extended to, say, 5 seconds (the ordinary value may be once measured when connecting the terminals, or may be measured periodically during communication, or it may be instructed by the user; the response time may be measured periodically, or the measuring interval may be varied in relation to the terminal load or the previous result of response time). By the change of this response time, the above method of picture compression, presence or absence of picture compression, priority of picture compression, picture size, and quantization step may be properly selected, combined and executed, so that the load at the reception terminal may be decreased, thereby shortening the response time (see case 1 in FIG. 16). The same processing may be done by receiving the reproduction time or decoding time at the reception terminal.

As the method in consideration of the terminal state of the reception side, the methods of measuring the capacity of reception buffer at the reception side terminal, load of reception side terminal, and response time of reception side terminal mentioned above may not be employed alone, but may be properly selected and combined (the same method can be applied to the sound). Moreover, by transmitting the information about the picture and sound processed on the basis of the priority information at the reception side terminal (in the presence of plural picture streams or sound streams, the information showing which stream is the picture or sound stream actually processed at the reception side terminal, or how many seconds is the duration of the reproduced image stream) to the transmission destination through communication route, the video data transmission from the transmission side to the reception side terminal is prevented from exceeding the processing capacity at the reception terminal (see case 2 in FIG. 16; by knowing the actually processed video data, the information quantity such as quantization parameter and picture size at the transmission side can be known; in this example, the processing is fed back in the unit of frame, but in the case of H. 263, as mentioned above, it may be the picture unit handled independently such as GOB). The same method is applied to the sound.

Figure 13:
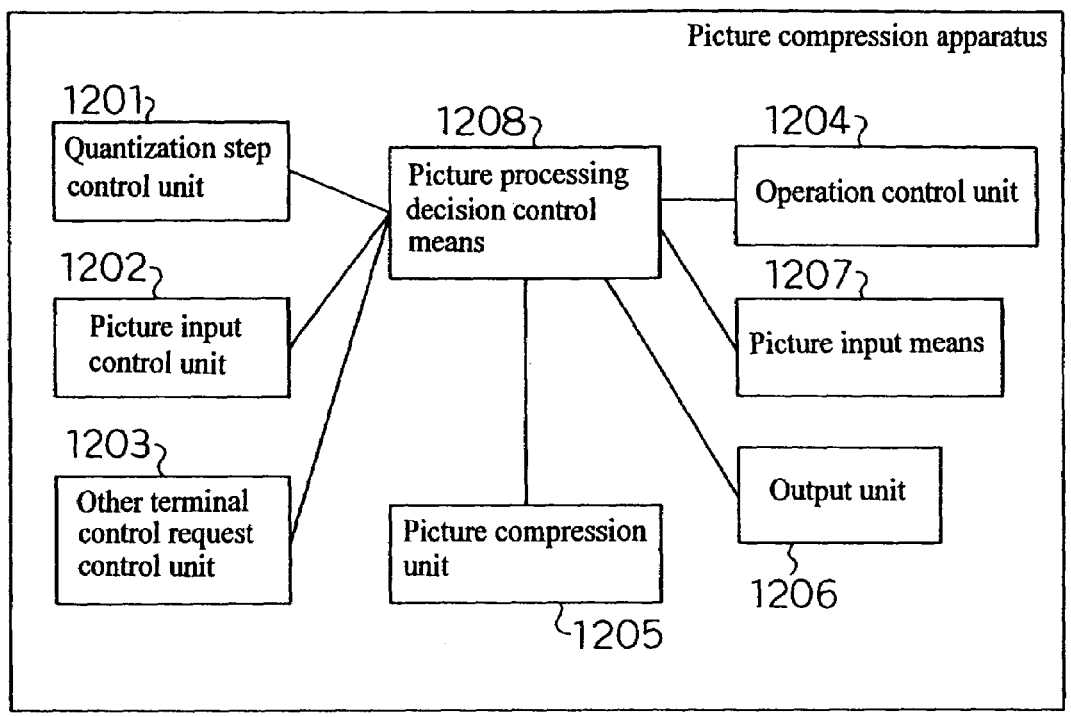
FIG. 13 is a diagram for explaining the picture compression apparatus in an embodiment of the invention.

FIG. 13 is a diagram for explaining a picture compression apparatus in an embodiment of the invention. This embodiment refers to picture, but it is similarly applied to compression of sound. In the example in FIG. 13, by changing the quantization step in every picture input means 1207, or by following up and changing the quantization step when the reception situation at the reception side terminal is changed by the control on the picture input means 1207, it is intended to decrease the increment of the generation quantity of compressed picture. The picture compression apparatus in FIG. 13 comprises a quantization step control unit 1201 for controlling the information about the quantization step, a picture input control unit 1202 for controlling the control state of the picture input means 1207, other terminal control request control unit 1203 for monitoring the situation of the reception buffer of the reception side terminal device, an operation control unit 1204 for recording and controlling the time transition of the control, a picture compression unit 1205 as means for compressing the picture, an output unit 1206 for delivering the result of compression to the communication route or memory device, picture input means 1207 for feeding the picture, and picture processing decision control means 1208 for controlling these parts and controlling the management.

The method of picture compression may include both standardized methods such as JPEG, MPEG1/2, H. 261, H. 263, and non-standardized methods such as wavelet and fractal. The picture input means 1207 may be camera, or recording device such as video or optical disk.

As the method of using this picture compression apparatus, in the case the picture input means 1207 is a camera, when the camera at the transmission side terminal is operated by the reception side terminal, or the camera is operated at the transmission side, the picture quality changes substantially, and the transmission coding quantity fluctuates. For example, when the camera contrast is raised, the picture is easier to see, but the transmission coding quantity increases. Accordingly, to decrease the coding quantity while the contrast is enhanced as mentioned above, the coding quantity can be suppressed by properly selecting, combining and executing the method of picture compression, presence or absence of picture compression, priority of picture compression, picture size, quantization step, and the number of steps.

Herein, the camera operation includes the came moving direction (pan, tilt, zoom), contrast, focus, and camera position (for example, the camera is directed downward when taking a drawing, and horizontal when taking a human figure). As the method of changing the method of picture compression, when the camera is directed downward, it is judged that document image is being taken, and the picture is transmitted in run length, and when the camera is in horizontal direction, it is judged that the human face is taken, the picture is taken and transmitted by H. 261. As a result, transmission of unnecessary information can be reduced.

When plural cameras are used and pictures obtained from plural cameras are transmitted, if the communication capacity is limited, the picture quality and number of frames of the image from the camera being noticed by the user may be increased, while the picture quality and number of frames of the image from other cameras may be decreased. By operating the picture quality and number of frames of the image obtained from the camera being noticed, the quantity of information increases, and it is necessary to adjust the quantity of generated information by limiting the picture obtained from other cameras accordingly. As the method of adjusting the quantity of generated information, the picture size, the quantization step, or the number of frames may be adjusted. An example of creating a panoramic picture by using plural cameras is described later in FIG. 15.

FIG. 14 is an example of information controlled by the operation control unit 1204. In the example in FIG. 14, the picture size, camera control, control request of other terminal, quantization step, and number of frames, not shown, are controlled. On the basis of such control information, the relation between the quantization step and camera operation is recorded and control as history information so that the reception buffer at the reception side terminal may not overflow, and therefore the limit about camera operation can be given to the user. By automatically changing the quantization step, picture size, and number of frames, overflow or underflow of reception buffer at the reception side terminal due to camera operation can be prevented.

Figure 15:
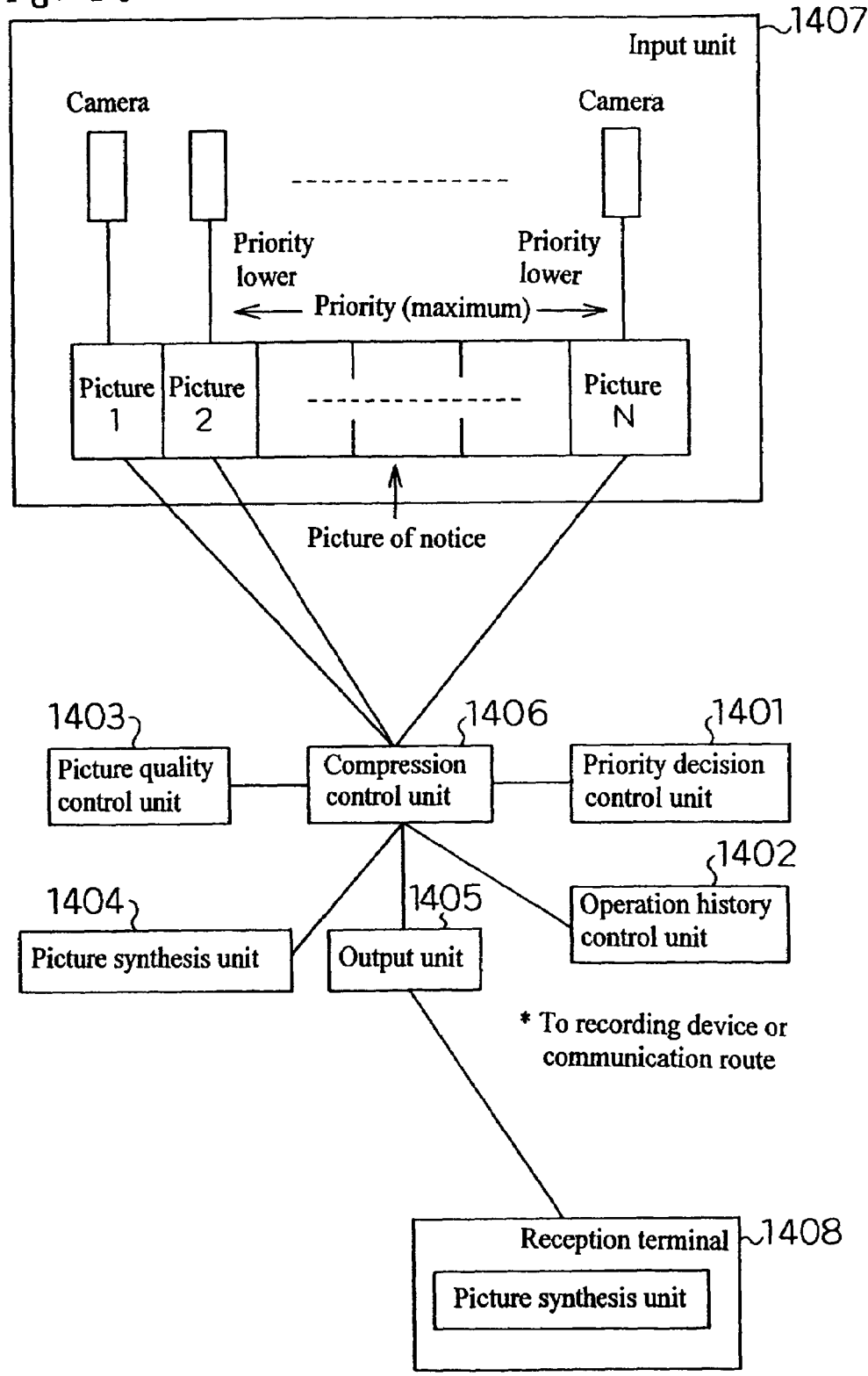
FIG. 15 is a diagram for explaining the picture compression apparatus for creating panoramic pictures.

FIG. 15 shows an example of application of the same picture compression apparatus in creation of panoramic picture. In the example in FIG. 15, the pictures entered from plural cameras are acquired in the input unit 1407. When the plural obtained pictures are joined (synthesized) without seam at the reception terminal 1408 side, if the reception terminal 1408 is overloaded, the terminal is broken down, and to prevent this, the pictures are provided with the priority defining the sequence of pictures to be processed in the case of overload of the reception terminal. As a result, the reception terminal 1408 side is prevented from being overloaded.

The picture compression apparatus shown in FIG. 15 comprises an input unit 1407 having plural (N) cameras, a priority decision control unit 1401 for providing the pictures obtained in the input unit 1407 with the priority, an operation history control unit 1402 for controlling the operation history of the cameras instructed and manipulated by the user (in order to notice in particular), a picture quality control unit 1403 for controlling the picture quality of the image, a picture synthesis unit 1404 for synthesizing the pictures obtained from the cameras according to the priority (not synthesizing pictures of low priority), an output unit 1405 for delivering the result of synthesis, and a compression control unit 1406 for controlling these parts. The output unit 1405 is connected to the reception terminal 1408 through communication route.

The output destination of the output unit 1405 may be either recording device or communication route. Synthesis of pictures may not be always done at the transmission side terminal. The pictures provided with the priority may be sent to the reception side terminal through the communication route, and synthesized at the reception terminal side. When the plural obtained pictures are synthesized at the transmission side terminal and reproduced at the reception side terminal, the obtained pictures are synthesized at the transmission side in the sequence of priority necessary (for display) at the reception terminal, and the synthesized picture is transmitted to the reception terminal device through the transmission route.

As the method of assigning the priority, the higher priority or higher picture quality (for example, greater number of frames or higher resolution) may be assigned in the sequence of the picture obtained by the camera instructed by the user, or the picture obtained from the camera most often instructed in the past (the picture of high priority may not be always set at high picture quality). As a result, the picture of the higher degree of notice by the user is displayed at high picture quality by priority. Depending on the priority assigned to the picture, the picture transmission from the transmission side terminal may be controlled, or by controlling the expanding or displaying of the picture at the reception side terminal, the response of the terminal at the user can be assured.

Besides, sequentially from the picture higher in priority, higher in picture quality, or greater in the number of frames, the priority and picture quality are lowered in steps with respect to the adjacent joined picture (the priority may be controlled at the transmission side terminal, or reception side terminal). The method of determining the priority may not be always based on the operation history of cameras. As mentioned above, the priority may be determined on the basis of the local decoding time required for compression, or the execution rate for specifying the number of times of execution of processing may be defined in the peripheral pictures, sequentially from the picture higher in priority, higher in picture quality, or greater in the number of frames. As for the sound, by providing the plural cameras with microphones individually, and controlling the presence or absence of compression of sound, only the sound corresponding to the picture in the direction noticed by the user can be synthesized.

Further, as mentioned above, by referring to the response time between the transmission side terminal and reception side terminal, the quantization step or number of frames may be determined. By transmitting the information about the picture processed on the basis of the priority information when the reception side terminal is overloaded to the transmission destination through the communication route, the picture data transmission from the transmission side to the reception side terminal is prevented from exceeding the processing capacity of the reception terminal. Also by transmitting the frame skip state at the reception terminal to the transmission side, the data quantity can be adjusted depending on the state.

Moreover, by transmitting the picture by the transmission method accompanied by retransmission, and transmitting the sound by the transmission method not accompanied by retransmission, it is constituted so that the reception side terminal transmits any information out of the retransmission count of picture, error rate of received sound, and information about discarding rate, to the transmission side terminal. Thus, as the transmission side terminal, by determining any one of the picture compression method, the quantization step, number of frames, size of picture to be compressed, and presence or absence of picture compression, it is possible to control to minimize delay of sound transmission without disturbing the picture. For example, in the communication using the TCP/IP, the picture transmission is realized by the TCP, and the sound transmission by UDP (the picture and sound may be transmitted physically in the same transmission route or not). The communication method is not limited to the TCP/IP alone. In this method, when transmitting plural pictures or sounds simultaneously, the discarding rate or error rate may be defined in each sound, and plural picture compression methods or transmission methods may be controlled.

Lastly, in the case of picture transmission at low bit rate by using analog telephone circuit or large fluctuation of picture data, usually, a large block noise occurs in the picture. In such a case, it is hard to maintain the picture quality by the compression process alone. Accordingly, by using a filter which passes only low frequency signal (for example, low pass filter by picture processing, or physical polarizing filter) in the monitor at the picture output side, although the picture seems less sharp, the picture free from noise or objectionable pattern is obtained.

INDUSTRIAL APPLICABILITY

As clear from the description herein, when decoding or synthesizing plural pictures or sounds simultaneously, it is advantageous that the processing quantity can be controlled on the basis of the priority depending on the load situation at the terminal.

The invention is also beneficial that plural pictures or sounds can be synthesized depending on the accounting situation.

What is claimed is:

1. A picture decoding and coding apparatus comprising:
   a picture coding apparatus including a picture coding unit operable to code pictures and provide a picture identifier for each picture as an I, P or B picture,
   a priority providing unit operable to correlate each coded picture with a priority identifier which is independent of the picture identifier, and
   a transmission control unit operable to transmit or store the coded pictures with the priority identifiers, and a picture decoding apparatus including a reception control unit operable to receive or read the coded pictures, and
a picture decoding unit operable to decode the coded pictures with the priority identifiers,
wherein each priority identifier is used by the picture decoding apparatus to determine whether each picture should be processed or not be processed according to a processing capacity of the picture decoding apparatus, and each priority identifier is used independently of the picture identifiers and independently of whether the picture is an I, P or B picture.

2. A picture decoding and coding apparatus according to claim 1, wherein the priority identifiers provided for the I pictures include at least two different levels of priority.

3. A picture decoding and coding apparatus according to claim 1, wherein the priority identifiers provided for inter-frame coded pictures and intra-frame coded pictures include a first priority level and a second priority level, respectively, which are different from each other.

4. A picture coding apparatus comprising:
a picture coding unit operable to code pictures and provide a picture identifier for each picture as an I, P or B picture,
a priority providing unit operable to correlate each coded picture with a priority identifier which is independent of the picture identifier; and
a transmission control unit operable to transmit or store the coded pictures with the priority identifiers to a picture decoding apparatus,
wherein each priority identifier is used by the picture decoding apparatus to determine whether each picture should be processed or not be processed according to a processing capacity of the picture decoding apparatus and each priority identifier is used independently of the picture identifiers and independently of whether the picture is an I, P or B picture.

5. A picture coding apparatus according to claim 4, wherein the priority identifiers provided for the I pictures include at least two different levels of priority.

6. A picture coding apparatus according to claim 4, wherein the priority identifiers provided for inter-frame coded pictures and intra-frame coded pictures include a first priority level and a second priority level, respectively, which are different from each other.

7. A picture decoding apparatus comprising:
a reception control unit operable to receive or read picture identifiers identifying an I, P or B picture for coded pictures with priority identifiers transmitted from a picture coding apparatus, and each picture; and
a picture decoding unit operable to decode the coded pictures with the priority identifiers,
wherein each priority identifier is independent of the picture identifiers and is used by the picture decoding apparatus to determine whether each picture should be processed or not be processed according to a processing capacity of the picture decoding apparatus and each priority identifier is used independently of the picture identifiers and independently of whether the picture is an I, P or B picture.

8. A picture decoding apparatus according to claim 7, wherein the priority identifiers provided for the I pictures include at least two different levels of priority.

9. A picture decoding and coding apparatus according to claim 7, wherein the priority identifiers provided for inter-frame coded pictures and intra-frame coded pictures include a first priority level and a second priority level, respectively, which are different from each other.

10. A picture decoding and coding apparatus comprising:
a picture coding apparatus including;
a picture coding unit operable to code pictures and provide a picture identifier for each picture as an I, P or B picture,
a priority providing unit operable to correlate each coded picture with a priority identifier which is independent of the picture identifier, and
a transmission control unit operable to transmit or store the coded pictures with the priority identifiers, and
a picture decoding apparatus including;
a reception control unit operable to receive or read the coded pictures, and
a picture decoding unit operable to receive the coded pictures with the priority identifiers,
wherein each priority identifier is used by the picture decoding apparatus to determine whether each picture should be processed or not be processed according to a processing load of the picture decoding apparatus and each priority identifier is used independently of the picture identifiers and independently of whether the picture is a I, P or B picture.

11. A picture decoding and coding apparatus according to claim 10, wherein the priority identifiers provided for the I pictures include at least two different levels of priority.

12. A picture decoding and coding apparatus according to claim 10, wherein the priority identifiers provided for inter-frame coded pictures and intra-frame coded pictures include a first priority level and a second priority level, respectively, which are different from each other.

13. A picture coding apparatus comprising:
a picture coding unit operable to code pictures and provide a picture identifier for each picture as an I, P or B pictures;
a priority providing unit operable to correlate each coded picture with a priority identifier which is independent of the picture identifier; and
a transmission control unit operable to transmit or store the coded pictures with the priority identifiers to a picture decoding apparatus,
wherein each priority identifier is used by the picture decoding apparatus to determine whether each picture should be processed or not be processed according to a processing load of the picture decoding apparatus, and each priority identifier is used independently of the picture identifiers and independently of whether the picture is an I, P or B picture.

14. A picture coding apparatus according to claim 13, wherein the priority identifiers provided for the I pictures include at least two different levels of priority.

15. A picture coding apparatus according to claim 13, wherein the priority identifiers provided for inter-frame coded pictures and intra-frame coded pictures include a first priority level and a second priority level, respectively, which are different from each other.

16. A picture decoding apparatus comprising:
a reception control unit operable to receive or read picture identifiers identifying an I, P or B picture for coded pictures with priority identifiers transmitted from a picture coding apparatus, and each picture; and
a picture decoding unit operable to decode the coded pictures with the priority identifiers,
wherein each priority identifier is independent of the picture identifiers and is used by the picture decoding apparatus to determine whether each picture should be processed or not be processed according to a processing load of the picture decoding apparatus, and each priority identifier is used independently of the picture identifiers and independently of whether the picture is an I, P or B picture.

17. A picture decoding apparatus according to claim 16, wherein the priority identifiers provided for the I pictures include at least two different levels of priority.

18. A picture decoding apparatus according to claim 16, wherein the priority identifiers provided for inter-frame coded pictures and intra-frame coded pictures include a first priority level and a second priority level, respectively, which are different from each other.

19. A picture decoding and coding apparatus comprising:
a picture coding apparatus including;
a picture coding unit operable to code pictures and provide a picture identifier for each picture as an I, P or B picture,
a priority providing unit operable to correlate each coded picture with a priority identifier which is independent of the picture identifier, and
a transmission control unit operable to transmit or store the coded pictures with the priority identifiers, and
a picture decoding apparatus including;
a reception control unit operable to receive or read the coded pictures, and
a picture decoding unit operable to decode the coded pictures with the priority identifiers,
wherein each priority identifier is used by the picture decoding apparatus to determine whether each picture should be processed or not be processed when the picture decoding apparatus is overloaded, and each priority identifier is used independently of the picture identifiers and independently of whether the picture is an I, P or B picture.

20. A picture decoding and coding apparatus according to claim 19, wherein the priority identifiers provided for the I pictures include at least two different levels of priority.

21. A picture decoding and coding apparatus according to claim 19, wherein the priority identifiers provided for inter-frame coded pictures and intra-frame coded pictures include a first priority level and a second priority level, respectively, which are different from each other.

22. A picture coding apparatus comprising:
a picture coding unit operable to code pictures and provide a picture identifier for each picture as an I, P or B picture;
a priority providing unit operable to correlate each coded picture with a priority identifier which is independent of the picture identifier; and
a transmission control unit operable to transmit or store the coded pictures with the priority identifiers to a picture decoding apparatus,
wherein each priority identifier is used by the picture decoding apparatus to determine whether each picture should be processed or not be processed when the picture decoding apparatus is overloaded, and each priority identifier is used independently of the picture identifiers and independently of whether the picture is an I, P or B picture.

23. A picture coding apparatus according to claim 22, wherein the priority identifiers provided for the I pictures include at least two different levels of priority.

24. A picture coding apparatus according to claim 22, wherein the priority identifiers provided for inter-frame coded pictures and intra-frame coded pictures include a first priority level and a second priority level, respectively, which are different from each other.

25. A picture decoding apparatus comprising:
a reception control unit operable to receive or read picture identifiers identifying an I, P or B picture for coded pictures with priority identifiers transmitted from a picture coding apparatus, and each picture; and
a picture decoding unit operable to decode the coded pictures with the priority identifiers,
wherein each priority identifier is independent of the picture identifiers and is used by the picture decoding apparatus to determine whether each picture should be processed or not be processed when the picture decoding apparatus is overloaded, and each priority identifier is used independently of the picture identifiers and independently of whether the picture is an I, P or B picture.

26. A picture decoding apparatus according to claim 25, wherein the priority identifiers provided for the I pictures include at least two different levels of priority.

27. A picture decoding apparatus according to claim 25, wherein the priority identifiers provided for inter-frame coded pictures and intra-frame coded pictures include a first priority level and a second priority level, respectively, which are different from each other.

* * * * *